(12) United States Patent
Yasunori

(10) Patent No.: US 12,255,757 B2
(45) Date of Patent: *Mar. 18, 2025

(54) RELAY DEVICE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 1017 days.

This patent is subject to a terminal disclaimer.

(21) Appl. No.: 17/278,791

(22) PCT Filed: Sep. 18, 2019

(86) PCT No.: PCT/JP2019/036579
§ 371 (c)(1),
(2) Date: Mar. 23, 2021

(87) PCT Pub. No.: WO2020/066789
PCT Pub. Date: Apr. 2, 2020

(65) Prior Publication Data
US 2022/0029855 A1     Jan. 27, 2022

(30) Foreign Application Priority Data

Sep. 25, 2018   (JP) .................................. 2018-179464

(51) Int. Cl.
*H04L 12/42* (2006.01)
*B60R 16/023* (2006.01)
(Continued)

(52) U.S. Cl.
CPC .......... *H04L 12/422* (2013.01); *B60R 16/023* (2013.01); *H04L 12/437* (2013.01); *H04L 2012/40273* (2013.01)

(58) Field of Classification Search
CPC ......... B60R 16/023; H04B 7/14; H04L 45/12; H04L 45/20; H04L 2012/40273;
(Continued)

(56) References Cited

U.S. PATENT DOCUMENTS 8,832,053 B2 * 9/2014 Yamamoto ........ H04L 12/40013
707/705
9,166,671 B2 * 10/2015 Tanaka ................ H04L 12/4625
(Continued)

FOREIGN PATENT DOCUMENTS

| | | |
|---|---|---|
| JP | 2015-170984 A | 9/2015 |
| JP | 2018-93370 A | 6/2018 |

OTHER PUBLICATIONS

Yoshifumi Kaku, Form Nikkei Electronics No. 1166 of the in-vehicle Ethernet that Denso thinks about, Nikkei Electronics, Mar. 20, 2016, p. 93-100.
(Continued)

*Primary Examiner* — Alex H. Tran
(74) *Attorney, Agent, or Firm* — Honigman LLP

(57) ABSTRACT

A relay device system is a relay device system to be installed in a vehicle, the relay device system including a wireless relay device configured to wirelessly communicate with a communication device provided outside the vehicle, a plurality of wired relay devices that are connected in a ring to the wireless relay device, and an in-vehicle network formed in a ring by a communication line connecting the wireless relay device and the plurality of wired relay devices, in which the plurality of wired relay devices each include an ECU communication unit configured to communicably con-
(Continued)

nect to an ECU for controlling an on-board device installed in the vehicle, and the wireless relay device and the plurality of wired relay devices are configured to communicate with each other through the in-vehicle network, using two clockwise and counterclockwise paths.

3 Claims, 4 Drawing Sheets

(51) Int. Cl.
   *H04L 12/40* (2006.01)
   *H04L 12/437* (2006.01)
(58) Field of Classification Search
   CPC ........ H04L 67/12; G08G 1/202; G08G 1/146; G08G 1/166; G08G 1/20; G08G 5/025; G08G 1/14; G08G 1/00; G08G 1/052; G08G 1/096725; G08G 1/143; G08G 1/164; G08G 1/096827; G08G 1/096844; G08G 1/161; G08G 1/167; H04W 4/46; B60L 2240/70; B62D 15/0285
   See application file for complete search history.

(56) References Cited

U.S. PATENT DOCUMENTS

| | | | | |
|---|---|---|---|---|
| 9,800,456 B2 * | 10/2017 | Komori | ................... | H04L 69/32 |
| 10,171,157 B2 * | 1/2019 | Zhou | ..................... | H04L 47/125 |
| 10,766,491 B2 * | 9/2020 | Mori | ..................... | B60W 50/14 |
| 2011/0145433 A1 * | 6/2011 | Noel | ..................... | H04L 12/437 |
| | | | | 709/232 |
| 2014/0301403 A1 * | 10/2014 | Yabe | ....................... | H04L 45/54 |
| | | | | 370/410 |
| 2015/0138954 A1 * | 5/2015 | Ross | ................... | H04L 41/0654 |
| | | | | 370/389 |
| 2018/0097721 A1 * | 4/2018 | Matsui | ..................... | H04L 45/28 |
| 2019/0280989 A1 * | 9/2019 | Itagawa | .................. | H04L 41/08 |
| 2021/0001914 A1 * | 1/2021 | Okayasu | ................ | B60K 35/00 |

OTHER PUBLICATIONS

Yuishi Torisaki, Examination and suggestion of the security measures in the CAN-Ethernet mixture vehicle installation network, A 2018 code and an information security symposium (SCIS2018) proceeding [USB] 2018 code and collection of information security symposium summaries, Abstracts of 2018 Symposium on Cryptography and Information Security, Jan. 23, 2018, p. 1-8.
International Search Report, Application No. PCT/JP2019/036579, mailed Dec. 10, 2019. ISA/Japan Patent Office.

* cited by examiner

| ASIL level | Example of corresponding ECU |
|---|---|
| QM | HMI-related ECU, air conditioner ECU |
| ASIL-A | Body-related ECU such as door mirror control |
| ASIL-B | Travel control-related ECU related to driving control and the like |
| ASIL-C | Travel control-related ECU related to braking control or the like |
| ASIL-D | Self-driving-related ecu related to self-driving control |

RELAY DEVICE SYSTEM

CROSS-REFERENCE TO RELATED APPLICATIONS

This application is the U.S. national stage of PCT/JP2019/036579 filed on Sep. 18, 2019, which claims priority of Japanese Patent Application No. JP 2018-179464 filed on Sep. 25, 2018, the contents of which are incorporated herein.

TECHNICAL FIELD

The present disclosure relates to a relay device system.

BACKGROUND

ECUs (Electronic Control Units) for controlling on-board devices, such as powertrain-related ECUs for engine control and the like and body-related ECUs for air conditioner control and the like, are installed in vehicles. Furthermore, if a vehicle has a self-driving function, ECUs that control on-board devices for performing self-driving are installed in the vehicle. These ECUs are connected with an in-vehicle network provided by CAN (Controller Area Network) or Ethernet (registered trademark), and are connected to communication devices located outside the vehicle (external devices) via an external network by a wireless relay device (external communicator) that has wireless functionality (e.g., see JP 2018-93370A).

The wireless relay device of JP 2018-93370A is connected to a wired relay device (gateway) by an in-vehicle network that uses Ethernet (registered trademark). ECUs (Electronic Control Units) are connected to a wired relay device with an in-vehicle network that uses CAN (Controller Area Network) or the like. The ECUs are able to communicate with communication devices located outside the vehicle via the wired relay device and the wireless relay device.

Because the wireless relay device and the wired relay device of JP 2018-93370A are connected to each other by a single path, if this path is interrupted due to disconnection or the like, communication between a communication device located outside the vehicle and an ECU connected to the wire relay device is not possible. Thus, the connection form between the wireless relay device and the wired relay device of JP 2018-93370A is problematic in that communication between inside and outside of the vehicle lacks redundancy.

The present disclosure has been made in view of such circumstances, and an object thereof is to provide a relay device system capable of improving the redundancy of communication between inside and outside of a vehicle when relaying communication received from outside of the vehicle to an ECU installed in the vehicle.

SUMMARY

A relay device system according to one aspect of this disclosure is a relay device system to be installed in a vehicle, the relay device system including a wireless relay device configured to wirelessly communicate with a communication device provided outside the vehicle, a plurality of wired relay devices connected in a ring to the wireless relay device, and an in-vehicle network formed in a ring by a communication line connecting the wireless relay device and the plurality of wired relay devices, in which the plurality of wired relay devices each include an ECU communication unit configured to communicably connect to an ECU for controlling an on-board device installed in the vehicle, and the wireless relay device and the plurality of wired relay devices are configured to communicate with each other through the in-vehicle network, using two clockwise and counterclockwise paths.

Advantageous Effects of Disclosure

According to one aspect of this disclosure, it is possible to provide a relay device system capable of improving the redundancy of communication between inside and outside of a vehicle when relaying communication received from outside of the vehicle to an ECU installed in the vehicle.

DETAILED DESCRIPTION OF PREFERRED EMBODIMENTS

Figure 1:
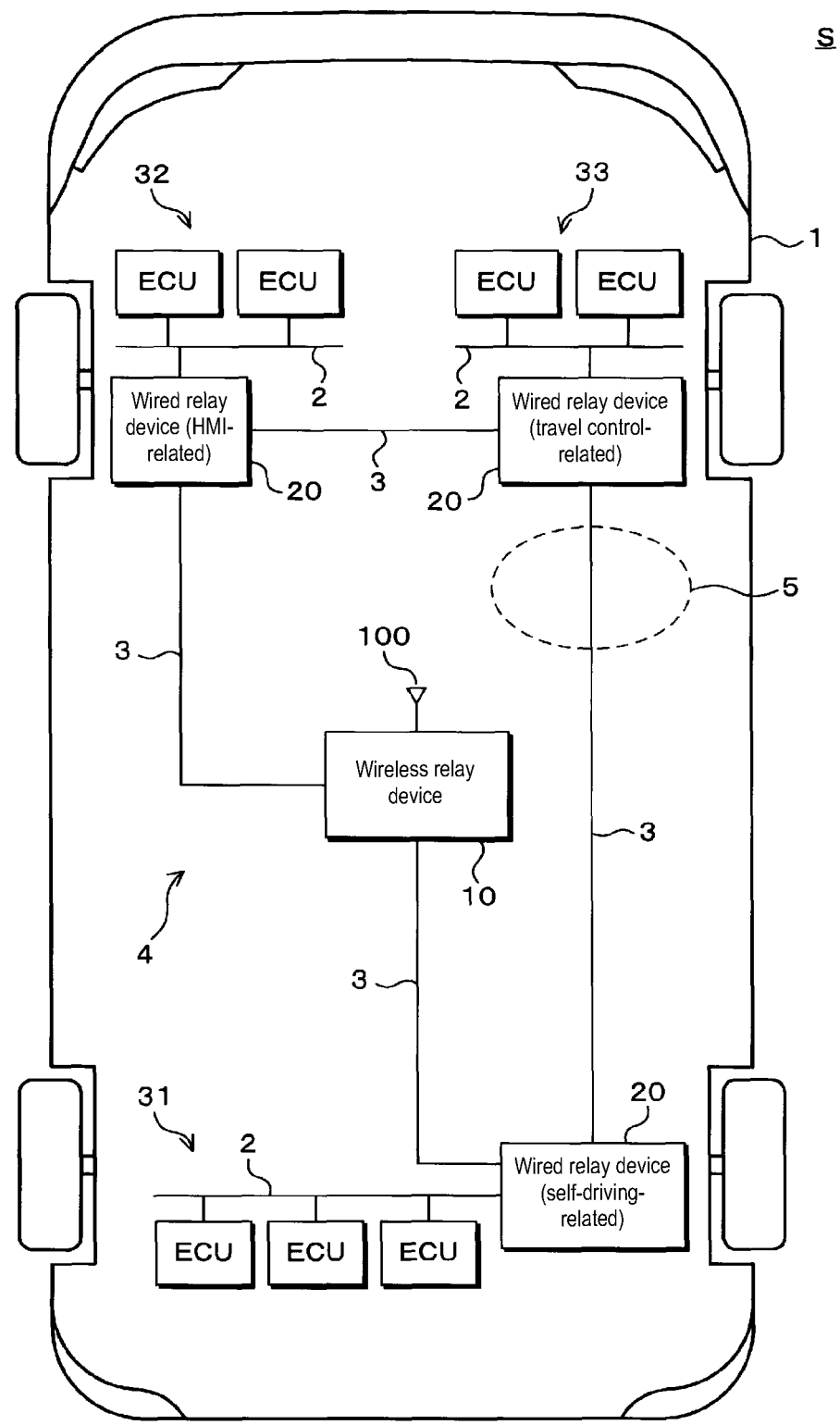
FIG. 1 is a schematic diagram showing a configuration of a relay device system according to Embodiment 1.

First, embodiments of the present disclosure will be listed and described. Also, at least parts of the embodiments described below can be freely combined.

A relay device system according to one aspect of this disclosure is a relay device system to be installed in a vehicle, the relay device system including a wireless relay device configured to wirelessly communicate with a communication device provided outside the vehicle, a plurality of wired relay devices that are connected in a ring to the wireless relay device, and an in-vehicle network that is formed in a ring by a communication line connecting the wireless relay device and the plurality of wired relay devices, in which the plurality of wired relay devices each include an ECU communication unit configured to communicably connect to an ECU for controlling an on-board device installed in the vehicle, and the wireless relay device and the plurality of wired relay devices are configured to communicate with each other through the in-vehicle network, using two clockwise and counterclockwise paths.

In this aspect, the wireless relay device and the plurality of wired relay devices communicate with each other through the in-vehicle network formed in a ring, using two clockwise and counterclockwise paths. Therefore, even if any of the communication lines is disconnected and one of the paths is interrupted, for example, it is possible to continue communication between the wireless relay device and the plurality of wired relay devices, and to improve the redundancy of communication between inside and outside of the vehicle.

In the relay device system according to one aspect of this disclosure, the wireless relay device and the wired relay devices each include a first wired communication unit that corresponds to a clockwise side of the in-vehicle network, and a second wired communication unit that corresponds to a counterclockwise side of the in-vehicle network, and the ring-like in-vehicle network is formed by connecting the first wired communication unit of any one of the wireless relay device and the wired relay devices and the second wired communication unit of the wireless relay device or the wired relay device that is directly connected to the one relay device to each other by the communication line.

In this aspect, it is possible to easily form a ring-like in-vehicle network by connecting the first wired communication unit of any one of the wireless relay device and the wired relay devices and the second wired communication unit of the wireless relay device or the wired relay devices that is directly connected to the one relay device to each other by the communication line.

In the relay device system according to one aspect of this disclosure, the wireless relay device includes a control unit configured to control communication with the wired relay devices, and the wireless relay device is configured to communicate with the wired relay devices with use of either a predetermined clockwise or counterclockwise path in the in-vehicle network, and, if the control unit has detected an abnormality in communication via the predetermined path, the control unit communicates with the wired relay devices with use of a path that is different from the predetermined path.

In this aspect, if an abnormality in communication with the wired relay devices via a predetermined path is detected, the control unit of the wireless relay device communicates with the wired relay devices using a path that is different from the predetermined path, that is, a path extending in a direction opposite to that of the predetermined path, and thus it is possible to improve the redundancy of communication between inside and outside of the vehicle.

In the relay device system according to one aspect of this disclosure, the wireless relay device includes a control unit configured to control communication with the wired relay devices, and the control unit is configured to acquire information regarding the path to be used in communication with the wired relay devices, and determine a path of communication with the wired relay devices based on the acquired information regarding the path, and, if the control unit has detected an abnormality in communication via the determined path, the control unit modifies the information regarding the path so as to use a different path from the determined path.

In this aspect, if an abnormality in communication with the wired relay devices is detected depending on the path determined based on acquired information, the control unit of the wireless relay device modifies the information (path information) regarding the path so as to use a different path from the determined path. Therefore, after an abnormality has been detected in communication with the wired relay devices, the wireless relay device communicates with the wired relay devices via a path determined based on the modified information, and thus it is possible to improve the redundancy of communication between inside and outside of the vehicle.

In the relay device system according to one aspect of this disclosure, the ECU includes a self-driving-related ECU, and an HMI-related ECU, and the self-driving-related ECU is connected to the ECU communication unit of one of the two wired relay devices that are directly connected on the clockwise side and the counterclockwise side of the wireless relay device, and the HMI-related ECU is connected to the ECU communication unit of the other of the two wired relay devices.

In this aspect, the wired relay device that is connected to the self-driving-related ECU and the wired relay device that is connected to the HMI-related ECU are directly connected to the wireless relay device. The wired relay device that is connected to the self-driving-related ECU and the wireless relay device are directly connected to each other, and the communication quality of information regarding self-driving is secured by reducing the number of hops (the number of relays) in communication between the self-driving-related ECU and a communication device provided outside the vehicle, and thereby safety regarding self-driving can be improved. Also, by directly connecting the wired relay device that is connected to the HMI-related ECU and the wireless relay device to each other, other wired relay devices need not relay large volume data such as moving image data or streaming data that is communicated between the HMI-related ECU and a communication device provided outside the vehicle.

The following specifically describes the present disclosure based on the drawings illustrating embodiments thereof. A relay device system S according to embodiments of the present disclosure will be described below with reference to the drawings. Note that the present disclosure is not limited to these examples, but is indicated by the scope of the claims, and all changes that come within the meaning and range of equivalency of the claims are intended to be embraced therein.

Embodiment 1

FIG. 1 is a schematic diagram showing a configuration of the relay device system S according to Embodiment 1. The relay device system S is installed in a vehicle 1, and includes a wireless relay device 10 and three wired relay devices 20.

Each of the wireless relay device 10 and the three wired relay devices 20 are communicably connected to another relay device (the wireless relay device 10 or a wired relay device 20) located on both the clockwise side and the counterclockwise side thereof, via a communication line 3 such as an Ethernet (registered trademark) cable or the like, for example. That is, a ring-like in-vehicle network 4 (ring network topology) is constituted due to the wireless relay device 10 and the three wired relay devices 20 being connected to each other via the communication lines 3. Note that the number of wired relay devices 20 is three, but is not limited thereto. The number of wired relay devices 20 need only be two or more, as long as the number of relay devices including the wired relay devices 20 and the wireless relay device 10 is three or more, and the ring-like in-vehicle network 4 can be formed by these relay devices (the wired relay devices 20 and the wireless relay device 10).

The wireless relay device 10 is connected to an external antenna 100 for wirelessly communicating with communication devices (not shown) outside the vehicle. The wireless relay device 10 wirelessly communicates with communication devices outside the vehicle, and transmits (relays) various types of data received through this wireless communication to the wired relay devices 20. The wireless relay device 10 relays communication between communication devices outside the vehicle and later-described ECUs (Electronic Control Units) installed in the vehicle. Also, the wireless relay device 10 relays communication between the two wired relay devices 20 that are directly connected thereto.

The plurality of wired relay devices 20 are communicably connected to ECUs (self-driving-related ECUs 31, HMI-related ECUs 32, and travel control-related ECUs 33) that control on-board devices via ECU wiring 2 such as a CAN (Controller Area Network/registered trademark) cable or an Ethernet cable. Note that the ECUs that are each connected to one of the plurality of wired relay devices 20 are not limited to the self-driving-related ECUs 31, the HMI-related ECUs 32, or the travel control-related ECUs 33, and may be body-related ECUs for controlling the driving of a door mirror or a seat, for example, and various ECUs installed in the vehicle 1 are connected to these multiple wired relay devices 20.

The HMI-related ECUs 32 are connected to the wired relay device 20 that is directly connected on the clockwise side of the wireless relay device 10. The self-driving-related ECUs 31 are connected to the wired relay device 20 that is directly connected on the counterclockwise side of the wireless relay device 10. The travel control-related ECUs 33 are connected to the wired relay device 20 connected between the wired relay device 20 for the HMI-related ECUs 32 and the wired relay device 20 for the self-driving-related ECUs 31.

Each wired relay device 20 relays communication between the wireless relay device 10 or the other wired relay devices 20 directly connected on the clockwise side and the counterclockwise side thereof. Also, each wired relay device 20 relays information transmitted from the wireless relay device 10 or another wired relay device 20, and transmits the information to the ECUs that are directly connected thereto. Each wired relay device 20 relays information transmitted from the ECUs that are directly connected thereto, and transmits the information to the wireless relay device 10 or another wired relay device 20.

The wireless relay device 10 is located in a central portion of the vehicle 1, and is provided on the roof of the vehicle 1, and accordingly, the external antenna 100 connected to the wireless relay device 10 can favorably receive radio waves. The wired relay device 20 that is connected to the self-driving-related ECUs 31 is provided in a rear portion of the vehicle 1. The wired relay device 20 that is connected to the HMI-related ECUs 32 is provided in a front portion of the vehicle 1 on the opposite side to a driver's seat 5, such as inside an instrument panel (dashboard), for example. The wired relay device 20 that is connected to the travel control-related ECUs 33 is provided in the front portion of the vehicle 1 on the driver's seat 5 side, such as inside the instrument panel (dashboard), for example. By arranging each wired relay device 20 as close as possible to the ECUs that are connected thereto in this manner, it is possible to simplify routing, such as by shortening the wiring length of the ECU wiring 2 connecting the wired relay device 20 and the ECUs.

Figure 2:
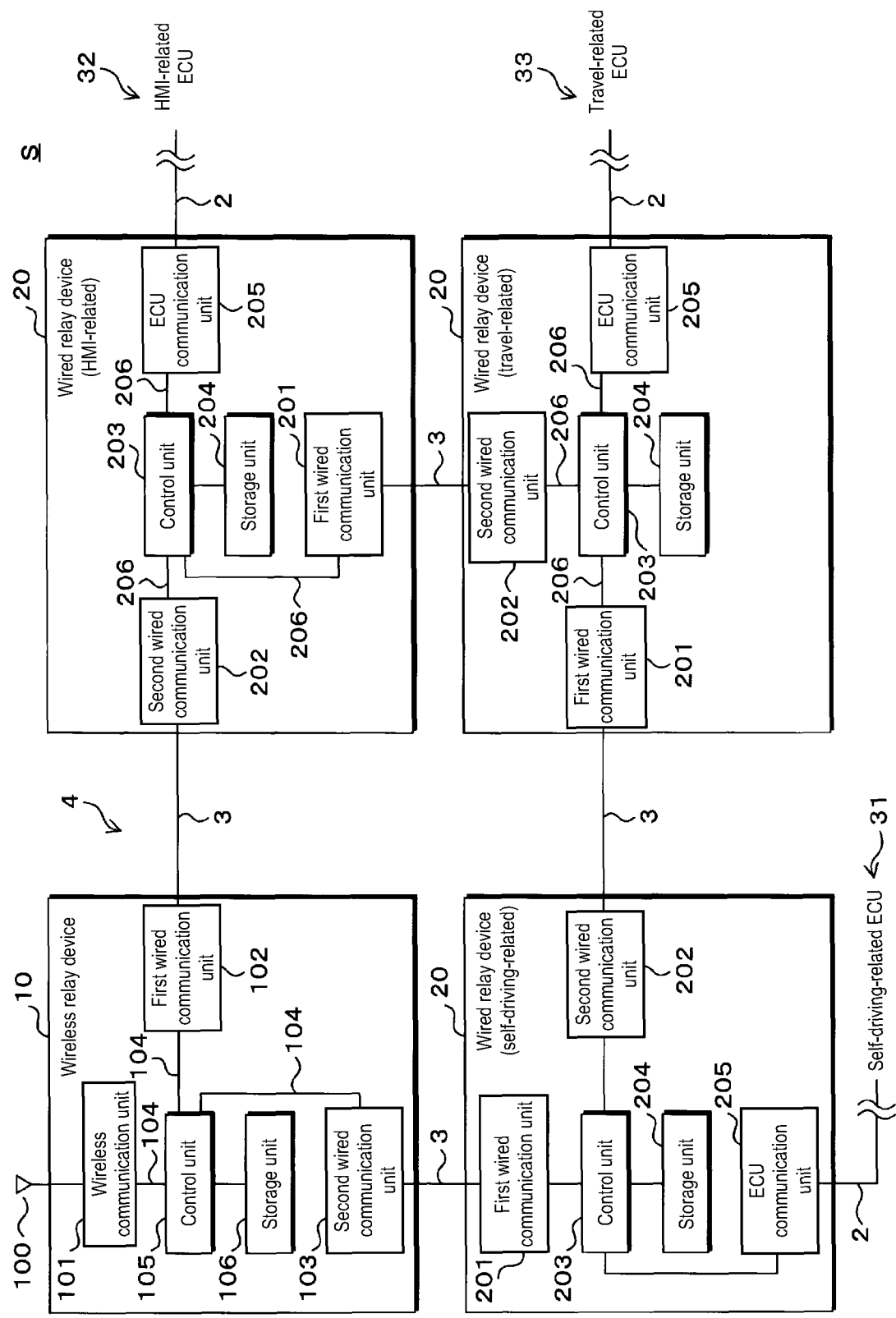
FIG. 2 is a block diagram showing configurations of a wireless relay device and wired relay devices.

FIG. 2 is a block diagram showing configurations of the wireless relay device 10 and the wired relay devices 20. The wireless relay device 10 includes a wireless communication unit 101, a control unit 105, a storage unit 106, a first wired communication unit 102, and a second wired communication unit 103, and is connected to the external antenna 100. Note that the wireless relay device 10 may include this external antenna 100.

The wireless communication unit 101 is connected via a harness or the like to the external antenna 100 for wirelessly communicating with communication devices outside the vehicle. The wireless communication unit 101 uses a predetermined wide-area communication standard such as 5G, 4G, LTE, or the like, to wirelessly communicate with communication devices outside the vehicle, and is a communication device known as a TCU (Telematics Communication Unit), for example.

The control unit 105 may be constituted by a CPU (Central Processing Unit), an MPU (Micro Processing Unit), or the like, and performs various types of control processing and arithmetic processing by reading out and executing control programs and data previously stored on the storage unit 106. The control unit 105 is communicably connected via an internal bus 104 to the wireless communication unit 101, the first wired communication unit 102, and the second wired communication unit 103. The control unit 105 performs control to relay data to be communicated to the wireless communication unit 101, the first wired communication unit 102, and the second wired communication unit 103 by executing the control programs.

The control programs include security programs for ensuring the security of the wireless relay device 10. The control unit 105 executes the security programs to exhibit security functions to handle unauthorized communication (attacks) from outside of the vehicle by way of, for example, DoS attacks or data containing viruses, worms, or the like, and thus ensure the security (secure a secure communication state) of the wireless relay device 10.

The storage unit 106 is constituted by a volatile memory element such as RAM (Random Access Memory), or a non-volatile memory element such ROM (Read Only Memory), EEPROM (Electrically Erasable Programmable ROM), or flash memory, and pre-stores control programs and data that is referenced when processing is performed. The control programs stored on the storage unit 106 may also be control programs that are read out from a recording medium (not shown) readable by the wireless relay device 10 and stored on the storage unit 106. Also, the control programs may also be downloaded from an external computer (not shown) that is connected to a communication network (not shown) and stored on the storage unit 106.

Path information for communicating with the plurality of wired relay devices 20 or the ECUs connected to the plurality of wired relay devices 20 is stored on the storage unit 106 in table form, for example. The path information includes addresses of the plurality of wired relay devices 20 and ECUs. Furthermore, the path information includes, as paths for transmitting (relaying) information to the plurality of wired relay devices 20 and the ECUs, a correspondence relationship as to which of the first wired communication unit 102 or the second wired communication unit 103 is to be used to transmit the information to the addresses of the plurality of wired relay devices 20 and the ECUs. Accordingly, by referencing the path information stored on the storage unit 106, the control unit 105 can relay communication between the ECUs and communication devices outside the vehicle, or communication between the ECUs.

The first wired communication unit 102 and the second wired communication unit 103 are input-output I/Fs such as Ethernet communication ports, and the protocols of the physical layers thereof may be of IEEE standards such as 100BASE-T1 or 1000BASE-T1, for example. If the first wired communication unit 102 and the second wired communication unit 103 are Ethernet communication ports, for example, port numbers of communication ports are set (provided) to the first wired communication unit 102 and the second wired communication unit 103. The port number of the first wired communication unit 102 is one, and the port number of the second wired communication unit 103 is two, for example. In the above-described path information stored on the storage unit 106, the port number (1) of the first wired communication unit 102 or the port number (2) of the second wired communication unit 103 is set in correspondence with the addresses of the plurality of wired relay devices 20 and the ECUs (the port numbers are set in association with the addresses). Note that a port number for loopback (e.g., zero) may be set for the address of this wireless relay device 10.

The wired relay devices 20 each include a first wired communication unit 201, a second wired communication unit 202, a control unit 203, a storage unit 204, and an ECU communication unit 205. The control unit 203 of the wired relay device 20 has a configuration that is similar to that of the control unit 105 of the wireless relay device 10 described above. The control unit 203 of the wired relay device 20 is communicably connected to the first wired communication unit 201, the second wired communication unit 202, and the ECU communication unit 205 via an internal bus 206. The control unit 203 performs control to relay data to be communicated to the first wired communication unit 201, the second wired communication unit 202, and the ECU communication unit 205 by reading out and executing control programs and data stored on the storage unit 204.

The control programs of the wired relay device 20 may also include security programs for ensuring the security of the wired relay device 20, similarly to the control programs of the wireless relay device 10. The control unit 203 of the wired relay device 20 exhibits security functions to handle unauthorized communication (attacks) such as data containing viruses and thus ensure the security of the wired relay device 20.

The storage unit 204 of the wired relay device 20 has a configuration that is similar to that of the storage unit 106 of the wireless relay device 10 described above. Path information for communicating with the wireless relay device 10, the other wired relay devices 20, or the ECUs is stored on the storage unit 204 of the wired relay device 20 in table form, for example, similarly to the storage unit 106 of the wireless relay device 10. The path information includes the addresses of the wireless relay device 10, the plurality of wired relay devices 20, and the ECUs. Furthermore, the path information includes a correspondence relationship as to which of the first wired communication unit 201 and the second wired communication unit 202 is to be used to transmit (relay) the information to the addresses of the wireless relay device 10, the plurality of wired relay devices 20, and ECUs, as paths for transmitting (relaying) information to the wireless relay device 10, the plurality of wired relay devices 20, and the ECUs.

The plurality of wired relay devices 20 and the wireless relay device 10 function as a layer 2 switch or a layer 3 switch, for example. If the plurality of wired relay devices 20 and the wireless relay device 10 function as a layer 2 switch, the MAC addresses of the plurality of wired relay devices 20, the wireless relay device 10, and the ECUs are stored on the storage unit 204 as path information. If the plurality of wired relay devices 20 and the wireless relay device 10 function as a layer 3 switch, the IP addresses of the plurality of wired relay devices 20, the wireless relay device 10, and the ECUs are stored on the storage unit 204 as path information. Accordingly, by referencing the path information stored on the storage unit 204, the control unit 203 of the wired relay device 20 can relay communication between the ECUs connected to this wired relay device 20 and communication devices outside the vehicle, or communication between the ECUs connected to this wired relay device 20 and the ECUs connected to other wired relay devices 20.

The first wired communication unit 201 and the second wired communication unit 202 of the wired communication unit 20 are input-output I/Fs such as Ethernet communication ports that conform to standards similar to those of the first wired communication unit 102 and the second wired communication unit 103 of the wireless relay device 10, and the protocols of physical layers may be 100BASE-T1 or 1000BASE-T1, for example.

The first wired communication unit 201 of the wired relay device 20 that is directly connected on the counterclockwise side of the wireless relay device 10 and the second wired communication unit 103 of the wireless relay device 10 are connected by the communication line 3 via an Ethernet cable such as that of 100BASE-T1 or 1000BASE-T1, for example. The second wired communication unit 202 of the wired relay device 20 that is directly connected on the clockwise side of the wireless relay device 10 and the first wired communication unit 102 of the wireless relay device 10 are connected by the communication line 3 in a similar manner. The wired relay device 20 that is not directly connected to the wireless relay device 10 is connected to the other wired relay devices 20 that are directly connected on the clockwise side and the counterclockwise side via the first wired communication unit 201 (on the clockwise side) and the second wired communication unit 202 (on the counterclockwise side). That is, the first wired communication unit 201 (on the clockwise side) of the wired relay device 20 that is not directly connected to the wireless relay device 10 and the second wired communication unit 202 (on the counterclockwise side) of the other wired relay device 20 that is directly connected on the clockwise side of this wired relay device 20 are connected to each other via the communication line 3. The second wired communication unit 202 (on the counterclockwise side) of the wired relay device 20 that is not directly connected to the wireless relay device 10 and the first wired communication unit 201 (on the clockwise side) of the other wired relay device 20 that is directly connected on the clockwise side of this wired relay device 20 are connected to each other via the communication line 3.

The ECUs are connected to a corresponding one of the plurality of wired relay devices 20 via the respective ECU communication units 205. The ECUs are constituted by programs for controlling the corresponding on-board devices and microcomputers and the like for executing the programs. As shown in FIG. 1, each of the ECUs (the self-driving-related ECUs 31, the HMI-related ECUs 32, and the travel control-related ECUs 33) is connected to one of the wired relay devices 20 according to the priority level of that ECU regarding traveling safety.

Figures 3, 4:
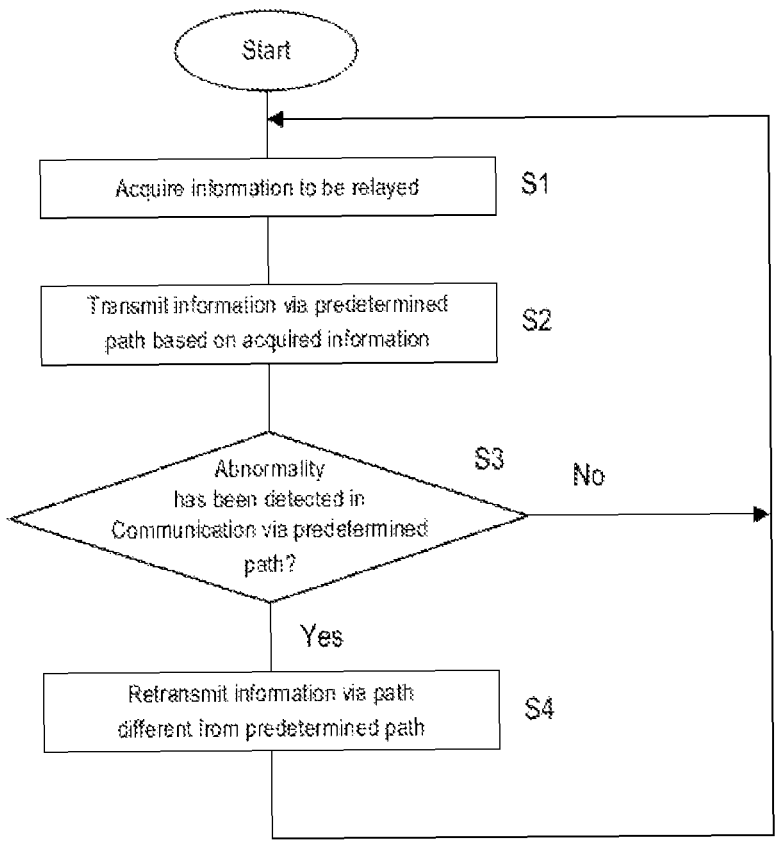
FIG. 3 is an illustrative diagram regarding priority levels of ECUs regarding traveling safety.
FIG. 4 is a flowchart showing processing performed by a control unit according to Embodiment 1 (different path).

FIG. 3 is an illustrative diagram regarding priority levels of the ECUs regarding traveling safety. The priority levels of the ECUs (the self-driving-related ECUs 31, the HMI-related ECUs 32, and the travel control-related ECUs 33) regarding the traveling safety of the vehicle 1 are determined based on the corresponding on-board devices and the functions of the programs to be executed, and may be determined based on, for example, ASIL (Automotive Safety Integrity Level) in ISO 26262. As shown in FIG. 3, the ASIL levels are classified into levels QM, ASIL-A, ASIL-B, ASIL-C, and ASIL-D. The QM level is normal quality management in which it is not necessary to apply functional safety according to ISO 26262. The ASIL-A to ASIL-D levels are levels at which functional safety needs to be applied in accordance ISO 26262, and the functional safety requirements become stricter from ASIL-A to ASIL-D. That is, the QM level can be regarded as the lowest priority level, and the ASIL-D level can be regarded as the highest priority level.

As the ECUs corresponding to the ASIL levels, for example, ECUs that correspond to the QM level may be HMI (Human Machine Interface)-related ECUs 32 that control or process entertainment-related data such as moving image data or streaming data handled by an HMI device such as car navigation and TV. ECUs that correspond to the ASIL-A level are body-related ECUs that control the positions of the seats, control the door mirrors, or the like. The ECUs that correspond to the ASIL-B level are travel control-related ECUs 33 related to control such as driving control of engines, motors, or the like. The ECUs corresponding to the ASIL-C level are travel control-related ECUs 33 related to control such as steering wheel control or brake control. The ECUs corresponding to the ASIL-D level are self-driving-related ECUs 31 related to self-driving control.

Alternatively, the priority levels of the ECUs regarding the traveling safety of the vehicle 1 are set such that the priority level of the self-driving-related ECUs 31 is the highest, the priority level of the ECUs that perform control related to the turning or stopping of the vehicle 1 is the next highest, and the priority level of the ECUs that perform control related to the traveling (running) of the vehicle 1 is the next highest. Configurations are also possible in which the priority level of ECUs that perform control other than the forms of control mentioned above, such an HMI-related ECUs 32 that control HMI-related devices, is the lowest.

As described above, the ECUs (the self-driving-related ECUs 31, the HMI-related ECUs 32, and the travel control-related ECUs 33) are connected to a corresponding one of the plurality of wired relay devices 20. The self-driving-related ECUs 31 are connected to the wired relay device 20 that is directly connected on the counterclockwise side of the wireless relay device 10. The travel control-related ECUs 33 are connected to the wired relay device 20 that is not directly connected to the wireless relay device 10. That is, the wired relay device 20 that is connected to the self-driving-related ECUs 31 is a wired relay device having a higher priority level regarding the traveling safety of the vehicle 1 than that of the wired relay device 20 that is connected to the travel control-related ECUs 33. By directly connecting the wired relay device 20 having a higher priority level regarding the traveling safety of the vehicle 1 to the wireless relay device 10 in this manner, it is possible to reduce the number of hops (the number of relays) in communication between communication devices outside the vehicle and the ECU having a higher priority level regarding the traveling safety of the vehicle 1, such as the self-driving-related ECUs 31, and, to secure communication quality.

The HMI-related ECUs 32 are connected to the wired relay device 20 that is directly connected on the clockwise side of the wireless relay device 10. Large volume data such as moving image data or streaming data is transmitted and received between a display device under the control of the HMI-related ECUs 32 and communication devices outside the vehicle, for example. By directly connecting the wired relay device 20 that is connected to the HMI-related ECUs 32 to the wireless relay device 10, it is possible to suppress the flow of large volume data to the other wired relay devices 20, and to eliminate processing in which the other wired relay devices 20 relay large volume data.

The respective control units 105 and 203 of the wireless relay device 10 and the plurality of wired relay devices 20 acquire information transmitted from communication devices outside the vehicle or the other relay devices (the wireless relay device 10 or the wired relay devices 20), and reference path information respectively stored on the storage units 106 and 204 based on the destination addresses included in the information. The control units 105 and 203 determine, based on the referenced path information, whether to use a clockwise (the first wired communication units 102 and 201) path or a counterclockwise (the second wired communication units 103 and 202) path in the in-vehicle network 4 forming a ring. Alternatively, the respective control units 105 and 203 of the wireless relay device 10 and the plurality of wired relay devices 20 may derive predetermined paths decided in advance and are respectively stored on the storage units 106 and 204, based on the destination addresses included in this information. The respective control units 105 and 203 of the wireless relay device 10 and the plurality of wired relay devices 20 relay information by transmitting the acquired information via the determined or derived paths (clockwise or counterclockwise).

If the respective control units 105 and 203 of the wireless relay device 10 and the plurality of wired relay devices 20 have detected an abnormality in communication with the other relay devices, such as failure of normal transmission of the information transmitted via the paths, the control units 105 and 203 communicate with the other relay devices via paths that are different from the determined or derived paths. That is, if the determined or derived path is clockwise, when the respective control units 105 and 203 of the wireless relay device 10 and the plurality of wired relay devices 20 have detected an abnormality in the clockwise path, the control units 105 and 203 communicate with the other relay devices via the counterclockwise path. If the determined or derived path is counterclockwise, when the respective control units 105 and 203 of the wireless relay device 10 and the plurality of wired relay devices 20 detect an abnormality in the counterclockwise path, the control units 105 and 203 communicate with the other relay devices via a clockwise path.

If the respective control units 105 and 203 of the wireless relay device 10 and the plurality of wired relay devices 20 have detected an abnormality in communication via the determined or derived path, the control units 105 and 203 may modify path information that is stored on the respective storage units 106 and 204. The path information is stored with the path corresponding to the address of the wired relay device 20 or the like serving as the destination as the first wired communication units 102 and 201, for example, and if an abnormality has been detected in communication with that wired relay device 20 via the first wired communication units 102 and 201, the respective control units 105 and 203 modify the path corresponding to the address of that wired relay device 20 to the second wired communication units 103 and 202. The path information that is respectively stored on the storage units 106 and 204 is rewritten by modifying this path.

The respective control units 105 and 203 of the wireless relay device 10 and the plurality of wired relay devices 20 detect an abnormality in communication with other relay devices (the wireless relay device 10 or the wired relay devices 20) due to whether or not there is a reply to transmitted information, for example. The method for detecting an abnormality in communication is not limited thereto, and the respective control units 105 and 203 of the wireless relay device 10 and the plurality of wired relay devices 20 may periodically perform polling with the wireless relay device 10 or the wired relay devices 20 that is directly connected thereto, and detect an abnormality in communication based on the results of this polling, for example. Alternatively, the respective control units 105 and 203 of the wireless relay device 10 and the plurality of wired relay devices 20 may detect carrier sense in the first wired communication units 102 and 201 or the second wired communication units 103 and 202. Then, the control units 105 and 203 may detect disconnection of the communication line 3 connected to the first wired communication units 102 and 201 or the second wired communication units 103 and 202 based on whether or not the detected carrier sense has a predetermined voltage value, and thus detect an abnormality in communication. Furthermore, the respective control units 105 and 203 of the wireless relay device 10 and the plurality of wired relay devices 20 may store the location where this abnormality has occurred in the storage units 106 and 204 of these relay devices, based on the results of detection of abnormalities in communication. The location where the abnormality has occurred is specified as being between the relay device that detected the abnormality and the other relay device (the wireless relay device 10 or the wired relay devices 20) that is directly connected thereto. Alternatively, the location where the abnormality has occurred may be specified as being between relay devices (the wireless relay device 10 or the wired relay devices 20) that are specified by MAC addresses or IP addresses, for example. Also, the wireless relay device 10 may transmit information regarding the results of detection of abnormalities in communication, including information regarding the location where the abnormality has occurred in communication, to a communication device outside the vehicle via the wireless communication unit 101. As a result of storing, in the storage units 106 and 204, information regarding the results of detection of abnormalities in communication, including information regarding the location where abnormalities occur in communication, the respective control units 105 and 203 of the wireless relay device 10 and the plurality of wired relay devices 20 can efficiently perform control regarding communication paths based on the stored information.

The respective control units 105 and 203 of the wireless relay device 10 and the plurality of wired relay devices 20 detect an abnormality in communication with other relay devices (the wireless relay device 10 or the wired relay devices 20) in this manner. Furthermore, the control units 105 and 203 change the paths for communicating with the other relay devices (the wireless relay device 10 or the wired relay devices 20) or modify path information according to the results of detection, and thus it is possible to improve and secure the redundancy of communication between the wireless relay device 10 and the plurality of wired relay devices 20 connected to the in-vehicle network 4 formed in a ring. By securing the redundancy of communication between the wireless relay device 10 and the plurality of wired relay devices 20 connected to the in-vehicle network 4, it is possible to improve and secure the redundancy of communication with the ECUs that are respectively connected to the wired relay devices 20 and communication devices outside the vehicle.

FIG. 4 is a flowchart showing processing performed by the control unit 105 according to Embodiment 1 (different path). The control unit 105 of the wireless relay device 10 performs the following processing based on a predetermined input signal that is input regularly or in cases such as where the ignition switch (IG switch) is turned on.

The control unit 105 of the wireless relay device 10 acquires information to be relayed from a communication device outside the vehicle or a wired relay device 20, which is another relay device (step S01). The control unit 105 acquires information transmitted from a communication device outside the vehicle via the wireless communication unit 101. Alternatively, the control unit 105 acquires information transmitted from the wired relay device 20 that is directly connected on the clockwise side or the counterclockwise side of the wireless relay device 10 via the first wired communication unit 102 or the second wired communication unit 103. This information is information to be relayed to a wired relay device 20 or an ECU that is connected to a wired relay device 20.

The control unit 105 of the wireless relay device 10 transmits information via a predetermined path based on the acquired information (step S02). The control unit 105 references the destination address included in a header portion in the acquired information, for example, and derives a predetermined path. The control unit 105 references the path information stored on the storage unit, and derives the path corresponding to the destination address, that is, the path through which to communicate via the first wired communication unit 102 or the second wired communication unit 103. Alternatively, the control unit 105 may derive a predetermined path without referencing the path information, by using a default setting according to all acquired information is to be transmitted on a path via either the first wired communication unit 102 or the second wired communication unit 103.

The control unit 105 of the wireless relay device 10 detects whether or not an abnormality has occurred in communication via the predetermined path (step S03). The control unit 105 detects whether or not an abnormality has occurred in communication via the derived predetermined path, and determines whether or not an abnormality has occurred, based on the results of detection. If the control unit 105 of the wireless relay device 10 has transmitted information via the predetermined path and then has not received a reply to this transmission in a predetermined period of time, for example, the control unit 105 detects an abnormality in communication via the predetermined path.

If an abnormality has been detected (YES in step S03), the control unit 105 of the wireless relay device 10 retransmits the information via a path that is different from the predetermined path derived in step S02 (step S04). That is, if the predetermined path derived in step S02 is a clockwise path (the first wired communication unit 102), the control unit 105 performs communication via a counterclockwise path (the second wired communication unit 103), and retransmits the information that failed to transmit in step S02. The control unit 105 performs loop processing in order to perform the processing of step S01 again after performing the processing of step S04, and continues the processing for relaying the acquired information.

If no abnormality has been detected (NO in step S03), that is, if communication is normally performed via the predetermined path, the control unit 105 of the wireless relay device 10 performs loop processing in order to perform processing of step S01 again. If communication is normally performed via the predetermined path, the control unit 105 can continue processing for relaying the information by successively acquiring information to be relayed, and transmitting the information via the predetermined path.

Every time the control unit 105 of the wireless relay device 10 communicates with a wired relay device 20, which is another relay device, the control unit 105 detects whether or not an abnormality occurs in communication, and if the control unit 105 has detected an abnormality, the control unit 105 resumes communication via a path that is different from the predetermined path decided in advance, and thereby, the redundancy of communication in the in-vehicle network 4 can be achieved. Also, this abnormality temporarily occurs, and after being resolved, it is possible to perform communication between the wireless relay device 10 and the wired relay devices 20 in the in-vehicle network 4 via the predetermined path decided in advance.

Note that, although the flow of the processing performed by the control unit 105 of the wireless relay device 10 has been described in this embodiment, there is no limitation thereto. The respective control units 203 of the plurality of wired relay devices 20 can also achieve the redundancy of communication in the in-vehicle network 4 by performing processing similar to that of the control unit 105 of the wireless relay device 10.

Embodiment 2

Figure 5:
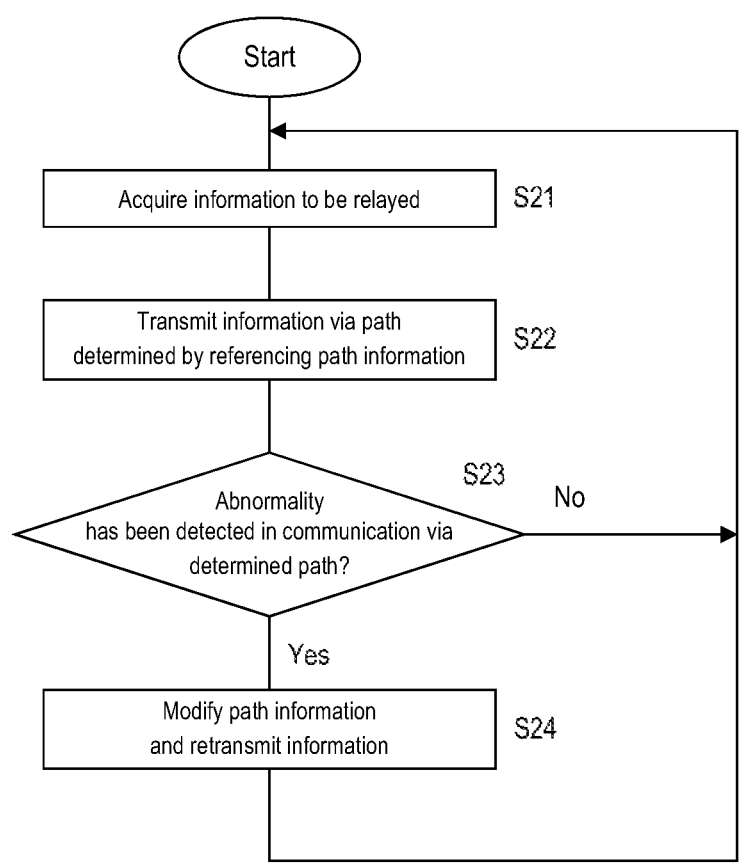
FIG. 5 is a flowchart showing processing performed by a control unit according to Embodiment 2 (modify path information).

FIG. 5 is a flowchart showing processing performed by the control unit 105 according to Embodiment 2 (modification of path information). The control unit 105 of the wireless relay device 10 performs the following processing based on an input signal that is input regularly or in cases such as when the ignition switch (IG switch) is turned on, in a manner similar to that of Embodiment 1. The control unit 105 of the wireless relay device 10 of Embodiment 2 is different from that of Embodiment 1 in terms of modifying path information.

Similarly to the processing (step S01) of Embodiment 1, the control unit 105 of the wireless relay device 10 acquires information to be relayed from a communication device outside the vehicle or a wired relay device 20, which is another relay device (step S21).

The control unit 105 of the wireless relay device 10 transmits information via a path determined by referencing the path information (step S22). The control unit 105 references the path information stored on a storage unit 106 based on the destination address included in a header portion of the acquired information, and determines whether to use the clockwise (the first wired communication unit 102) path or the counterclockwise (the second wired communication unit 103) path in the ring-like in-vehicle network 4.

The control unit 105 of the wireless relay device 10 detects whether or not an abnormality has occurred in communication via the determined path (step S23). The control unit 105 detects whether or not an abnormality has occurred in communication via the determined path, similarly to the processing of step S03 in Embodiment 1, and determines whether or not an abnormality occurs, based on the results of detection.

If an abnormality has been detected (YES in step S23), the control unit 105 of the wireless relay device 10 modifies the path information and retransmits the information (step S24). If the control unit 105 has detected an abnormality in communication with a wired relay device 20, which is another relay device, the control unit 105 modifies the path information so as to use a different path from the path set in the path information stored on the storage unit 106. Therefore, after the control unit 105 has detected an abnormality, the control unit 105 can resume communication with the wired relay device 20 by referencing the modified path information. The control unit 105 performs loop processing in order to perform the processing of step S21 again after performing the processing of step S24, and continues the processing for relaying the acquired information.

If no abnormality has been detected (NO in step S23), that is, if communication is normally performed via the predetermined path, the control unit 105 of the wireless relay device 10 performs loop processing in order to perform the processing of step S21 again. If communication is normally performed via the predetermined path, the control unit 105 can continue the processing for relaying the information by successively acquiring information to be relayed, and transmitting the information via the predetermined path.

Note that, although the flow of the processing performed by the control unit 105 of the wireless relay device 10 has been described in this embodiment, there is no limitation thereto. The respective control units 203 of the plurality of wired relay devices 20 can also perform similar processing to that of the control unit 105 of the wireless relay device 10 and thus can achieve the redundancy of communication in the in-vehicle network 4.

The embodiments that were disclosed here are to be considered in all aspects to be illustrative and not restrictive. The scope of the present disclosure is defined by the claims and not by the above description, and all changes that come within the meaning and range of equivalency of the claims are intended to be embraced therein.

The invention claimed is:

1. A relay device system to be installed in a vehicle, the relay device system comprising:
   a wireless relay device configured to wirelessly communicate with a communication device provided outside the vehicle;
   a plurality of wired relay devices that are connected in a ring to the wireless relay device;
   wherein the wireless relay device and the wired relay devices each include:
      a first wired communication unit that corresponds to a clockwise side of the in-vehicle network, and a second wired communication unit that corresponds to a counterclockwise side of the in-vehicle network; and
      an in-vehicle network formed in a ring by a communication line connecting the first wired communication unit of any one of the wireless relay device and the wired relay devices to the second wired communication unit of the wireless relay device or the wired relay device that is directly connected to the one relay device to each other by the communication line,
   wherein the plurality of wired relay devices each include an ECU communication unit configured to communicably connect to an ECU for controlling an on-board device installed in the vehicle, the ECUs include a self-driving-related ECU, a travel-related ECU and an HMI-related ECU, wherein the wired relay device connected to the travel-related ECU is interposed between the wired relay device connected to the self-driving ECU and the wired relay device connected to the HMI-related ECU,
   the wireless relay device and the plurality of wired relay devices are configured to communicate with each other through the in-vehicle network, using a clockwise path and counterclockwise path,
   the self-driving-related ECU is connected to the ECU communication unit of one of the two wired relay devices that are directly connected on one of the clockwise side and the counterclockwise side of the wireless relay device, and the HMI-related ECU is connected to the ECU communication unit of the other of the two wired relay devices,
   the wireless relay device is directly connected and communicates with the wired relay device that is connected to the self-driving-related ECU and is configured to reduce the number of hops in communication between the self-driving-related ECU and the communication device provided outside the vehicle; and
   the wireless relay device is directly connected and communicates with the wired relay device that is connected to the HMI-related ECU so as to avoid other wired relay devices needing to relay large volume data that is communicated between the HMI-related ECU and the communication device provided outside the vehicle, and
   the wireless relay device includes a wireless communication unit for wirelessly communicating with the communication device provided outside the vehicle.

2. The relay device system according to claim 1, wherein the wireless relay device includes a control unit configured to control communication with the wired relay devices, and the wireless relay device is configured to communicate with the wired relay devices with use of either a predetermined clockwise or counterclockwise path in the in-vehicle network, and if the control unit has detected an abnormality in communication via the predetermined path, the control unit communicates with the wired relay devices with use of a path that is different from the predetermined path.

3. The relay device system according to claim 1, wherein the wireless relay device includes a control unit configured to control communication with the wired relay devices, and the control unit is configured to:

acquire information regarding the path to be used in communication with the wired relay devices, and determine a path for communication with the wired relay devices based on the acquired information regarding the path, and if the control unit has detected an abnormality in communication via the determined path, the control unit modifies the information regarding the path so as to use a different path from the determined path.

\* \* \* \* \*